2 Sheets—Sheet 1.

R. H. WYMAN.

RAILWAY CAR.

No. 10,654. Reissued Oct. 20, 1885.

Witnesses:
W. L. Baker.
D. H. Fletcher

Inventor:
Richard H. Wyman.

R. H. WYMAN.

RAILWAY CAR.

No. 10,654. Reissued Oct. 20, 1885.

*Witnesses:*
W. L. Baker.
D. H. Fletcher.

*Inventor:*
Richard H. Wyman.

UNITED STATES PATENT OFFICE.

RICHARD H. WYMAN, OF EVANSTON, ILLINOIS.

RAILWAY-CAR.

SPECIFICATION forming part of Reissued Letters Patent No. 10,654, dated October 20, 1885.

Original No. 292,192, dated January 22, 1884. Application for reissue filed June 23, 1884. Serial No. 135,830.

*To all whom it may concern:*

Be it known that I, RICHARD H. WYMAN, of Evanston, in the county of Cook and State of Illinois, have invented a new, useful, and Improved Movable Cover for Coal and other Cars, of which the following is a description, reference being had to the accompanying drawings, in which—

Figure 1:
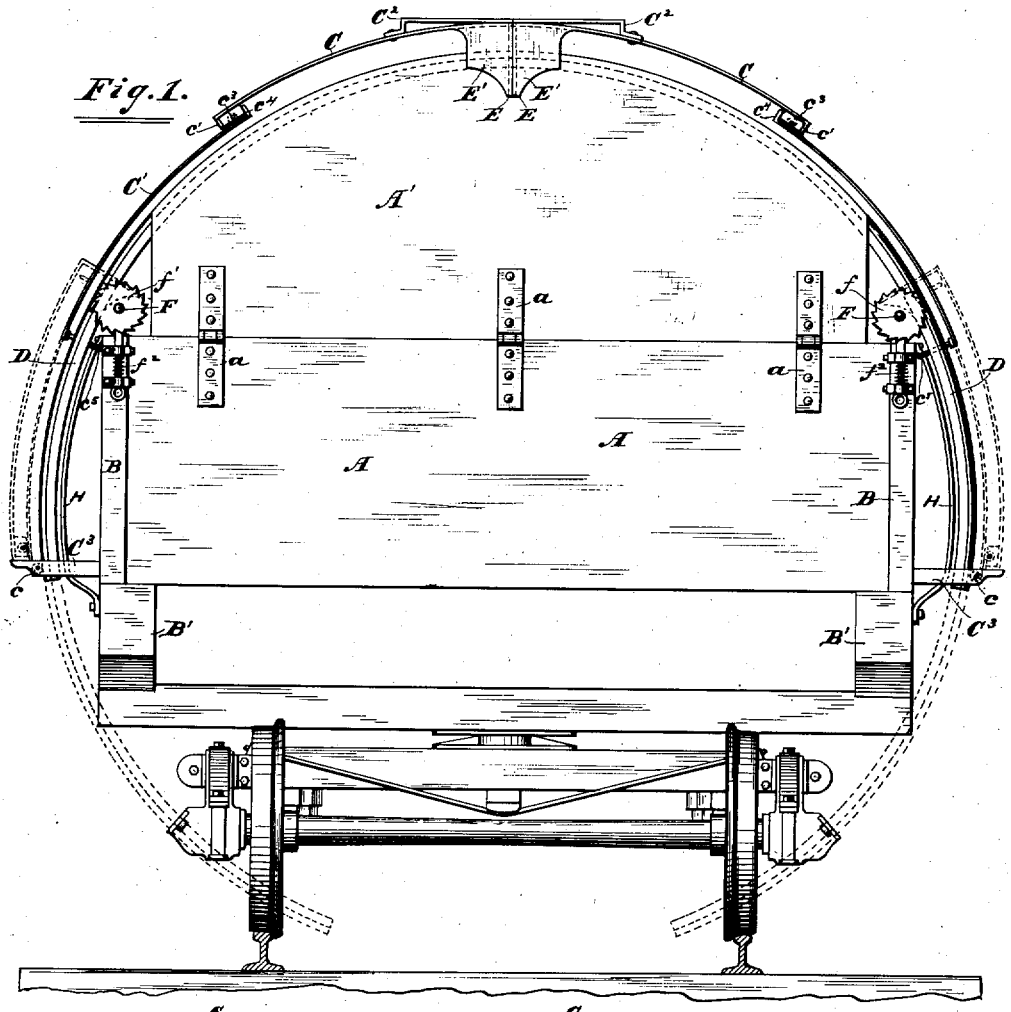
Figure 2:
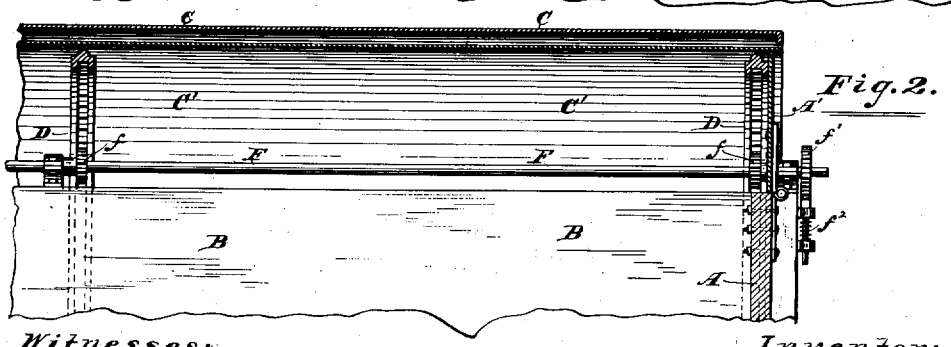
Figure 3:
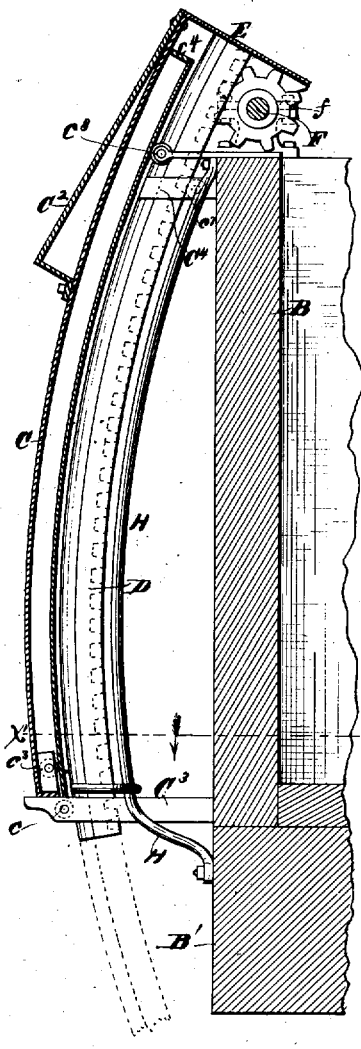
Figure 4:
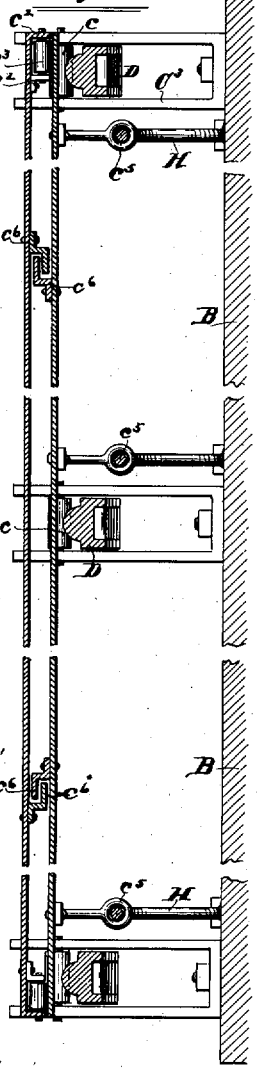
Figure 5:
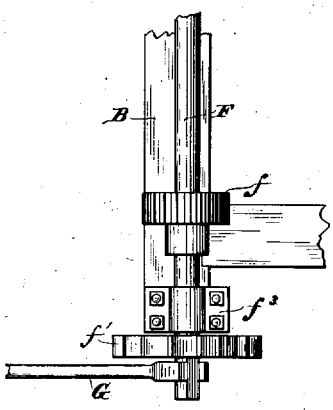

Figure 1 is an end view of the car-cover closed. Fig. 2 is a longitudinal sectional view on the line *x x*, Fig. 1, looking in the direction of the arrow. Fig. 3 is an enlarged cross-sectional view near the end of the car, showing the latter uncovered and the position of the cover when thrown back. Fig. 4 is a longitudinal sectional view in plan on the line *x x*, Fig. 3. Fig. 5 is a detail view in plan, and Fig. 6 an end view of the same, being the ratchet and lever for raising and lowering the cover.

Like letters of reference indicate like parts in the different figures.

Various disadvantages, annoyances, and pecuniary losses have heretofore been experienced by railway companies and shippers in the use of open cars for the shipment of coal and other loose articles of like character. The coal is not only damaged by snow and ice, but it frequently becomes frozen together, rendering it difficult and expensive to unload. Thieves often board the trains and throw coal from the cars while in transit, and steal it while the cars stand upon the tracks. This not only causes "shortage" directly, but the fact that it can be accomplished furnishes dishonest consignees an excuse for claiming shortage when there is none. Another serious loss to the railway companies lies in the fact that they are unable to transport high-class freight in open cars, and hence they are in most cases compelled to make the return-trip empty, the loss from which is obvious. The purpose of my invention is to overcome these difficulties by providing a movable cover capable of being applied to the ordinary coal-car, which shall possess the advantages of being light, durable, compact, inexpensive, easily and readily operated, and which shall form a thorough protection to the goods transported therein, both from the elements and from thieves, thereby rendering said cars capable of use for various classes of freight. I accomplish said object by placing upon each side of the car one or more convex plates or shells, of metal, wood, or compressed paper, but preferably the former, extending from end to end of said car, and adapted to move either upon rollers or otherwise in the segment of a circle, the edges meeting, when closed, over the top of said car above its center, and the whole forming a complete cover thereto of a semi-cylindrical shape. I prefer to operate said covers by means of shafts, one upon each side of the car, at any convenient point, said shafts being provided with suitable pinions adapted to engage with segmental racks, which may be sustained in position by means of a ratchet and pawl, the turning of said shafts in one direction causing the two halves of said cover to meet, as stated, while a reverse movement separates them, each moving outward and downward in a position adjacent to the side of the car, where it occupies comparatively little space, and does not interfere with the loading and unloading of said car. Said covers may be made in sections, so that a portion only of the car may be exposed at once, which plan possesses many advantages, all of which will be hereinafter more fully described, and definitely pointed out in the claims.

In the drawings, A represents the end-board, and B B the side-boards, of the box of an ordinary coal or open car, B′ B′ being the framework to which they are secured. Projecting outward from a point at or near the bottom of said side-boards I secure, by means of bolts or in any well-known manner, the brackets $C^3$ $C^3$ $C^3$, a top view of which is shown in Fig. 4. Said brackets are designed to form a support for the cover, as hereinafter described.

C C C′ C′ represent the semi-cylindrical sectional cover, consisting, preferably, of four convex iron plates, which I prefer to have extend the entire length of the car, so as to form a cover therefor. Said plates, which may be constructed as shown or corrugated, and made of any suitable material, are supported in the position shown by means of segmental bars D D D, each of which is rigidly secured at its upper end to the plates E E. (Indicated in dotted lines in Fig. 1, but more clearly shown in Fig. 3.)

Figure 6:
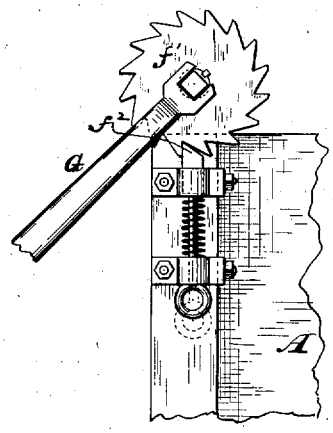

Running lengthwise and preferably upon the top of the side-boards B B, I place shafts F F, secured in bearings $f^3$, bolted to said boards, as in Fig. 5, one of which said shafts is shown in Fig. 2 running the full length of the car, though the same may be divided, as hereinafter stated, upon which shafts are rigidly secured pinions $f$ $f$, two or more of which I place upon each shaft, said pinions being adapted to engage with racks, as clearly shown in the drawings, upon the under side of the segmental bars D. Said bars are of sufficient length to extend from a central point above the top of the car, as shown in Fig. 1, to a point somewhat below the brackets $C^3$ $C^3$ on either side of said car, said bars D passing through sockets in the brackets $C^3$, the outside of said bars at the lower ends respectively bearing against friction-rollers $c$ $c$ $c$, secured, as shown, within or to the brackets. Upon one or both ends of each of the shafts F F, I place ratchet-wheels $f'$ $f'$, which are held in position normally by means of the spring-catches $f^2$ $f^2$, Figs. 1 and 6, thereby preventing the shafts from revolving in more than one direction when said catches are permitted to act. Thus it is obvious that the segmental racks D D, when resting upon said pinions $f$ $f$, with their lower ends sustained in the brackets against the rollers $c$ $c$, will be supported in the form of an arch above the body of the car, and in turn must support the plates C C C′ C′ above them, thus forming a complete semi-cylindrical sectional cover to the car. The outer ends of the shafts F F are squared, as shown in Figs. 1, 5, and 6, and by placing a wrench or crank-lever, G, thereon, as shown in said last-named figures, and withdrawing said spring-catches $f^2$ $f^2$, the racks may be lowered and raised at will, their position when at the lowest point being shown in dotted lines in Fig. 1.

Projecting outward, preferably from near the top of the side-board B, I place brackets $C^4$, one of which is shown in Fig. 3, with roller-bearings $c^7$ therein, through which brackets the bars D pass, being supported and guided thereby. Other brackets, $C^5$, with like rollers, $c^8$, on their outer ends, as shown in said figure, are projected from the top of said boards B, to form bearings for the movement of the sections C′ thereon.

The plates C C are bent inward, as shown in Fig. 3, forming flanges E, which serve not only to stiffen and support said cover and prevent it from sagging when closed, but form aprons to prevent coal from falling between the side-boards and cover, as well as to protect said shaft and pinions when the cover is thrown back. Said plates C C are likewise re-enforced by means of the plates $C^2$ $C^2$, Figs. 1 and 3, which are intended to form a walk upon the top of the car when the cover is closed, as in Fig. 1. The lower edge of each of the plates C C is bent inward, forming flanges $c'$ $c'$ thereon. Short flanges $c^2$ $c^2$ (better shown in Fig. 4) serve as bearings for the rollers $c^3$ $c^3$, which are intended to prevent friction between the plates C′ C′ when the cover is moved. Corresponding flanges, $c^4$ $c^4$, are bent outward upon the upper edge of the plates C′ C′ in such manner that when the plates C C are raised the flanges $c^2$ $c^2$ engage therewith and lift said plates or sections C′ C′ upward, as shown in Fig. 1, so that their lower edges are even, or nearly so, with the tops, respectively, of the side-boards B B.

To maintain the bottoms of the sections C′ C′ in position, I attach eyebolts $c^5$ $c^5$ $c^5$ thereto, connecting the same with guide-bars H H H, bolted, as shown, to the frame-work of the car and to the side-boards B B. To further stiffen the sections C C C′ C′, as well as to form guides for the movement of one over the other, and to hold them securely in position, I secure thereto flanged ribs $c^6$ $c^6$ $c^6$ $c^6$, Fig. 4, which permit the outer plate to slide back and forth over the other, while at the same time they are prevented from separating.

To protect and inclose the ends of the car, I secure to each of the end-boards A, (but one of which is shown,) by means of hinges $a$ $a$ $a$, Fig. 1, a board or plate, A′. This is prevented from swinging outward and is securely held in position by the flanges E′ E′, Fig. 1, the lowering of the sections C C serving to release said end plates, A′, which may then fold downward against the end-boards A. As shown in Fig. 3 and in the dotted lines in Fig. 1, the sections C C′ fold or slide over each other, the bottom of each resting when thrown back upon the brackets $C^3$ $C^3$, and the whole occupying but little more space than the side-boards B B. When the cover is closed, the sections C C may be locked together by means of a hasp and padlock or in any well-known manner, when it is obvious that said cover must remain in a secure position, and thus form a thorough protection to the car. Should a further support for said cover be needed other than the pinions $f$, the segmental bars D may be secured by inserting pins through them through or above the brackets $C^3$.

The shafts F may be divided into two or more sections or independent pieces, and corresponding divisions made in the plates C C C′ C′, by which arrangement a portion only of the car may be uncovered at a time, said sections taking the place of doors.

I do not confine myself to the specific mode of raising and lowering said covers or of supporting the same, as they may be supported at the ends of the car and elsewhere by means of arms attached to each section, and having pivotal bearings at or near the bottom of the car, said arms being drawn together and the sections raised by means of chains and a windlass, or in other equivalent ways; nor is it essential in using the shafts F that they be placed upon the top of the side-boards B, as it is apparent that the same may be located upon the sides of the car or at the bottom of the frame and render equally good results.

It is furthermore apparent that instead of dividing each half of said cover into sections they may be made in one piece, in which case they would, when open, occupy greater space, in that they would extend considerably below the bottom of the car.

The advantages of my invention are manifold, and are impliedly enumerated in the foregoing statement of disadvantages incident to the use of open cars, all of which it is believed it is adapted to overcome.

I am aware that cars of this class have been made having movable covers in which but a portion of the car could be uncovered at a time, the disadvantages of which are obvious and wholly unsuited to the present requirements of commerce. In such cars only one side could be loaded at a time, and the goods either moved therein by hand or the cover reversed while the other portion was being loaded. In the case of loading coal, ore, or other like material from a long steep chute, as is now the common practice, the car, being but partially uncovered, either could not be satisfactorily loaded without much hand-labor, or the portions of the cover remaining over the car would become battered and injured, if not wholly ruined, by the severe shocks incident to loading in this manner.

With my improved cover, constructed in four partially-cylindrical sections, I am enabled to uncover the entire car at once, the covers being adjusted at the sides, while the aprons described not only protect them from injury, but, being hopper-shaped, tend to prevent the coal from falling over the sides, thus saving labor in "trimming."

Having thus described my invention, what I claim, and desire to secure by Letters Patent, is—

1. A movable semi-cylindrical cover for coal-cars, comprising separate convex segmental plates sustained in bearings at opposite sides of the car, and mechanism, substantially as described, for raising and lowering the said plates to cover and uncover the car, substantially as described.

2. A semi-cylindrical cover for coal-cars, comprising separate convex segmental plates C, sustained in bearings at opposite sides of the car, in combination with rack-and-pinion mechanism, substantially as described, for raising the sections, whereby the car may be covered by the segmental plates forming a semi-cylindrical top and for lowering the sections to uncover the car, substantially as described.

3. A movable cover for railway freight or coal cars, consisting of the plates C C C′ C′, having segmental racks D D attached thereto, shafts F, pinions $f$, ratchets $f'$, guide-bars H, eyebolts $c^5$, and brackets $c^3$, whereby the car may be wholly uncovered while loading and unloading, substantially as and for the purpose set forth.

4. A movable sectional cover for railway freight or coal cars, consisting of the plates C C C′ C′, having segmental racks D D attached thereto, shafts F, pinions $f$, ratchets $f'$, guide-bars H, eyebolts $c^5$, brackets $c^3$, and plates or aprons E, substantially as and for the purposes set forth.

RICHARD H. WYMAN.

Witnesses:
D. H. FLETCHER,
W. S. BAKER.